(12) United States Patent
Henry

(10) Patent No.: US 7,225,395 B2
(45) Date of Patent: May 29, 2007

(54) METHODS AND SYSTEMS FOR END-TO-END DATA PROTECTION IN A MEMORY CONTROLLER

(75) Inventor: Russell Henry, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 689 days.

(21) Appl. No.: 10/642,954

(22) Filed: Aug. 18, 2003

(65) Prior Publication Data

US 2005/0044349 A1 Feb. 24, 2005

(51) Int. Cl.
*G08C 25/00* (2006.01)
(52) U.S. Cl. .................................................. 714/799
(58) Field of Classification Search ................ 713/153
See application file for complete search history.

(56) References Cited

U.S. PATENT DOCUMENTS

| | | | |
|---|---|---|---|
| 5,333,138 A | 7/1994 | Richards et al. ............... 371/7 |
| 5,526,370 A | 6/1996 | McAuley .................... 371/49.1 |
| 6,038,676 A | 3/2000 | Yanes et al. .................... 714/1 |
| 6,195,767 B1 | 2/2001 | Adams ......................... 714/47 |
| 6,438,639 B1 | 8/2002 | Bakke et al. ............... 710/302 |
| 6,449,623 B1 | 9/2002 | Bohannon et al. .......... 707/202 |
| 6,701,432 B1 * | 3/2004 | Deng et al. ................. 713/153 |
| 6,931,529 B2 * | 8/2005 | Kunzinger ................... 713/153 |
| 6,981,200 B2 * | 12/2005 | Maung et al. .............. 714/781 |
| 6,986,061 B1 * | 1/2006 | Kunzinger ................... 709/225 |
| 7,096,359 B2 * | 8/2006 | Agrawal et al. ............. 713/168 |
| 2002/0091921 A1 | 7/2002 | Kunzinger ................... 713/153 |

\* cited by examiner

*Primary Examiner*—Albert Decady
*Assistant Examiner*—Sam Rizk
(74) *Attorney, Agent, or Firm*—Ortiz & Lopez, PLLC

(57) ABSTRACT

Methods and systems for end-to-end data protection in a computer are disclosed. A data integrity field is generally associated with data transferred along a data path in a computer. A virtual end-to-end address can be established, which is associated with the data integrity field, wherein the virtual end-to-end address transfers encoded information to a controller of the computer through one or more addresses of a read and/or write request thereof. The encoded information can be utilized to identify an offending entity within the data path. An end-to-end access list can also be associated with the virtual end-to-end address, such that the end-to-end access list contains at least one entry for every data transfer request provided to an interface device. Data corruption is therefore preventable in the entire I/O path in a computer from a host bus adapter through to the actual physical drive.

17 Claims, 4 Drawing Sheets

METHODS AND SYSTEMS FOR END-TO-END DATA PROTECTION IN A MEMORY CONTROLLER

TECHNICAL FIELD

Embodiments generally relate to data-processing methods and systems. Embodiments also relate to data protection methods and systems utilized in data paths in computers. Embodiments additionally relate to memory controllers and peripheral component interconnect (PCI) local bus architectures.

BACKGROUND OF THE INVENTION

Computers are now utilized to perform functions and maintain data critical to many organizations. Businesses use computers to maintain and transfer essential financial and other business data. Computers are also utilized by government agencies and organizations to monitor, regulate, and even activate, national defense systems. Maintaining the integrity of transferred data, in particular, is essential to the proper functioning of such computer systems, and data corruption can have serious (even life threatening) consequences.

A number of factors can contribute to data corruption during the storage and transfer of data in computers and/or computers systems, including components thereof, such as memory controller devices. Conditions under which data corruption may occur can be a result of situations, such as, for example, data transfer delays or the transfer of data between components of a computer system. For example, if a computer or data-processing system is engaged in a "multi-tasking" operation or in overlapped input/output ("I/O") operations, data can become corrupted. Multi-tasking is the ability of a computer operating system to simulate the concurrent execution of multiple tasks. Importantly, concurrent execution is only "simulated" because there is usually only one CPU in today's personal computers, and it can only process one task at a time. Often, a system interrupt is used to rapidly switch between the multiple tasks, giving the overall appearance of concurrent execution. Despite such features, data corruption remains an inherent problem.

End-to-end data protection provides protection from data corruption in the I/O path from components such as a host bus adapter to the physical drive associated with the computer or computer system. It is essential that during the transfer of data to and from such components, faults be identified in the data path in order to repair and prevent damage to the computer in question. To this end, methods and systems are disclosed herein for improving end-to-end data protection in computers.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved end-to-end data protection methods and systems.

It is another aspect of the present invention to provide improved end-to-end data protection methods and systems for use with memory controllers.

It is yet another aspect of the present invention to provide an end-to-end virtual address, which can be utilized with end-to-end data protection methods and systems.

The aforementioned aspects of the invention and other objectives and advantages can now be achieved as described herein. Methods and systems for end-to-end data protection in a computer are disclosed. A data integrity field can be associated with data transferred along a data path in a computer, such that the data integrity field includes one or more reference tags, one or more meta tag and one or more guard fields. The meta tag(s) can comprise a static value and the reference tag(s), an incrementing value. A virtual end-to-end address can also be associated with the data integrity field, such that the virtual end-to-end address comprises one or more indexes, one or more offsets and/or at least one end-to-end bit are recognizable by the memory controller.

The virtual end-to-end address can transfer encoded information to a controller through at least one address of a read and write request thereof, such that the encoded information identifies an offending entity within the data path. An end-to-end access list can also be associated with the virtual end-to-end address, such that the end-to-end access list contains at least one entry for every data transfer request provided to an interface device, such as a host interface chip or drive interface chip. Additionally, a buffer address and a local memory can be associated with the memory controller, such that the buffer address is located within the local memory associated with the memory controller.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
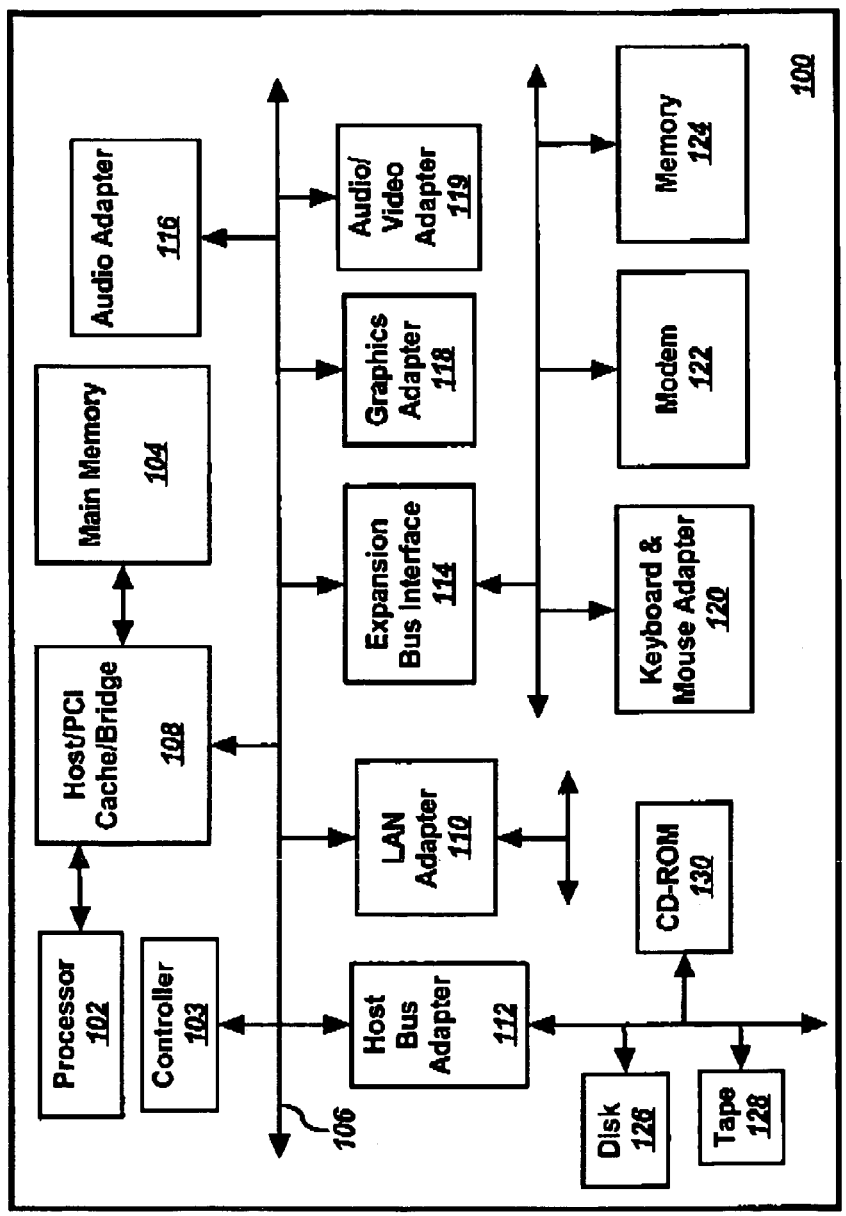
FIG. 1 illustrates a block diagram of a data processing system in which an embodiment of the present invention may be implemented.

With reference now to the figures, and in particular with reference to FIG. 1, a block diagram of a data processing system 100 in which the present invention may be implemented is illustrated. The depicted example is not meant to imply architectural limitations with respect to embodiments of the present invention, but is presented for general illustrative and edification purposes only. The present invention can be embodied with a data processing system such as system 100 or other data processing systems, such as, for example, a storage array controller.

Data processing system 100 can employ a peripheral component interconnect (PCI) local bus architecture. Although the depicted example employs a PCI bus, other bus architectures such as Micro Channel and ISA may be utilized, in accordance with alternative embodiments of the present invention. A Processor 102 and a main memory 104 can be connected to PCI local bus 106 through PCI bridge 108. PCI bridge 108 also may include an integrated memory controller and cache memory for processor 102. Alternatively, a controller 103 can communicate with PCI local bus 106 to provide additional architectural support. Controller 103 may be utilized in place of or to complement an integrated memory controller and cache memory for processor 102. Controller 103 can be implemented, for example, as a PCI-based memory controller for control of memory 104 and associated components. Memory 104 can be implemented as a main memory for data-processing system 100.

Thus, the controller 103 (e.g. memory controller) can communicate with the main memory 104 of system 100 via bus 106. Of course, while the memory controller 103 and the main memory 104 are suitable for use within a computer system such as the system 100 illustrated in FIG. 1, it should be clearly understood that such a use is but one of a wide variety of suitable uses for the memory controller 103 and the main memory 104. Accordingly, while the term "main" is used in conjunction with the memory 104 in view of the disclosed use thereof within the computer system 100, the term should not be seen as limiting any specific embodiment thereof. Furthermore, while computer systems or data-processing systems such as the system 100 typically include one or more memory devices in addition to the main memory, it should be clearly understood that the memory controller 103 and the main memory 104 may collectively be viewed as a memory subsystem suitable for use within a computer system or another memory-demanding electronic device.

Additional connections to PCI local bus 106 may be made through direct component interconnection or through add-in boards. In the depicted example, local area network (LAN) adapter 110, host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. Host bus adapter 112 provides a connection for hard disk drive 126, tape drive 128, and CD-ROM 130 in the depicted example.

Typical PCI local bus implementations will support three or four PCI expansion slots or add-in connectors. The depicted example includes four loads on the mother board and three expansion slots. Those of ordinary skill in the art will appreciate that the hardware in FIG. 1 may vary. For example, other peripheral devices, such as optical disc drives and the like may be used in addition to or in place of the hardware depicted in FIG. 1.

Figure 2:
FIG. 2 illustrates a block diagram of a data integrity field, which can be implemented in accordance with an embodiment of the present invention.

Turning now to FIG. 2, a block diagram of a data integrity field 200 is illustrated, in accordance with an embodiment of the present invention. As indicated herein, end-to-end (E2E) data protection provides protection from data corruption in the entire I/O path from, for example, a host bus adapter, such as the host bus adapter 112 depicted in FIG. 1, all the way through to the physical disk drive. Anyone handling data in this path should check the data integrity field (DIF) to ensure that the data has not been corrupted.

When a fault is detected, the offending entity in the data path can be isolated between the last two checks. This fault isolation technique can be a valuable tool in diagnosing failed components in modern networked systems. End-to-end data protection can be accomplished by adding a DIF to every 512 bytes of data. A DIF, such as data integrity field 200 of FIG. 2, can be 8 bytes long and composed of a reference tag 202, a meta tag 204, and a guard field 206. The reference tag 202 (also referred to as a "Ref Tag") is some reference to the data being sent typically based on a host logical block address. The meta tag 202 is generically a static value, similar to a host ID.

The guard field 206 is generally an error detecting mechanism, also known as a CRC (Cyclic Redundancy Check). CRC is a technique for detecting data transmission errors where a numerical value calculated by an algorithm is applied to the data sent. In the particular embodiment described herein, the reference tag 202 can be approximately 4 bytes long, while the meta tag 204 and guard field 206 are each generally 2 bytes long. Note that such data lengths are merely suggested values, and should not be considered limiting features of the present invention. Other data lengths are also possible, depending upon alternative embodiments thereof. The guard field 206 can be implemented as CRC The meta tag 204 comprises a static value, while the reference tag 202 comprises an incrementing value for every 512 bytes of data.

A PCI-based memory controller, such as, for example, controller 103 of FIG. 1 can receive a request to read or write memory and generally only receives an address to read from and write to. The address can possess a maximum of 64 bits, which places the memory controller (e.g., controller 103) in the data path, which makes it a candidate for performing DIF checking. In order to check the tag fields in the DIF, the memory controller requires a value for comparison. With only an address available, no values are present against which a comparison can be performed.

Figure 3:
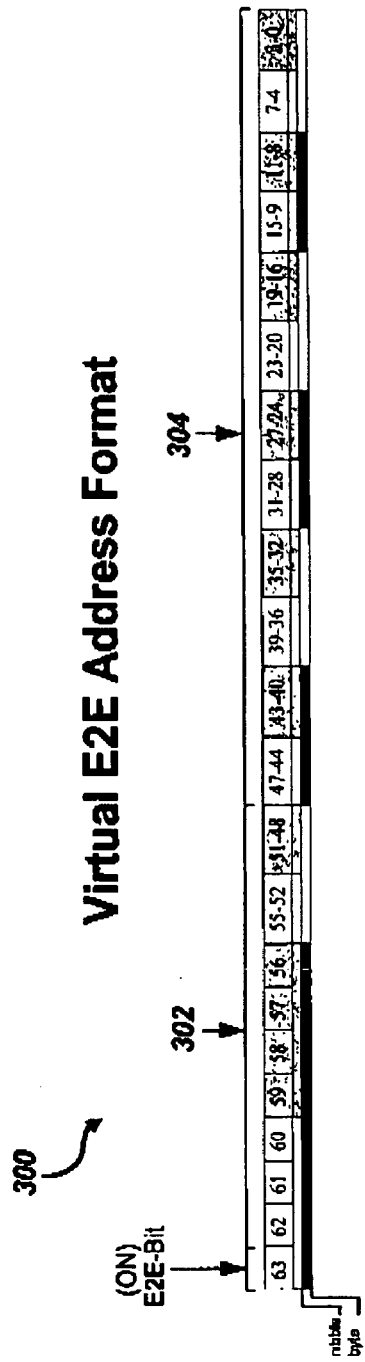
FIG. 3 illustrates a block diagram of a virtual E2E address format, which can be implemented in accordance with an embodiment of the present invention.

The DIF itself is larger than the actual address, so it is not possible to pass the entire DIF in the address. Thus, in accordance with an embodiment of the present invention, a virtual E2E address can be utilized to pass encoded information to the memory controller through the address of the PCI read and write requests. FIG. 3 illustrates a block diagram of a virtual E2E address format 300 of this type, which can be implemented in accordance with an embodiment of the present invention. Virtual E2E address format 300 includes an index 302 which is 15 bits, but can be varied in size to the match the requirements of the memory controller. Additionally, virtual E2E address format 300 includes an offset 304 which is 48 bits, but can also be varied in size to match the requirements of the memory controller.

Figure 4:
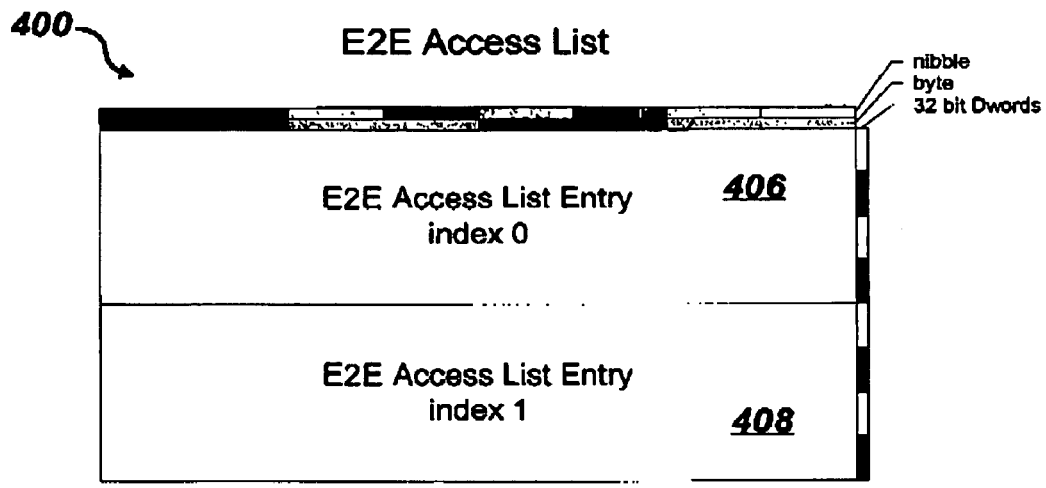
FIG. 4 illustrates a block diagram of an E2E access list, in accordance with an embodiment of the present invention.

FIG. 4 illustrates a block diagram of an E2E access list 400, in accordance with an embodiment of the present invention. The index field is an index into an E2E access list that contain one entry for every data transfer request provided to a host interface chip or drive interface chip, such as, for example, the Host/PCI cache/bridge component 108 depicted in FIG. 1. In array controller applications, the PCI accesses to the memory controller can be made from interface chips (i.e., source and drive side). The associated firmware requires an entry, fills out the entry and then utilizes the associated virtual address in the interface chips scatter gather list. A Scatter Gather List (SGL) is a list of buffer addresses and lengths that can identify where data is placed in memory. The interface chip can perform PCI read and write requests with the virtual address. The memory controller recognizes the virtual address by the E2E bit and utilizes the index to find the associated entry in the E2E access list. Examples of access list entries are illustrated in FIG. 4 as E2E Access List Entry 406 and 408, which are respectively associated with index 1 and index 2. The entry format itself is depicted in further detail in FIG. 5.

Figure 5:
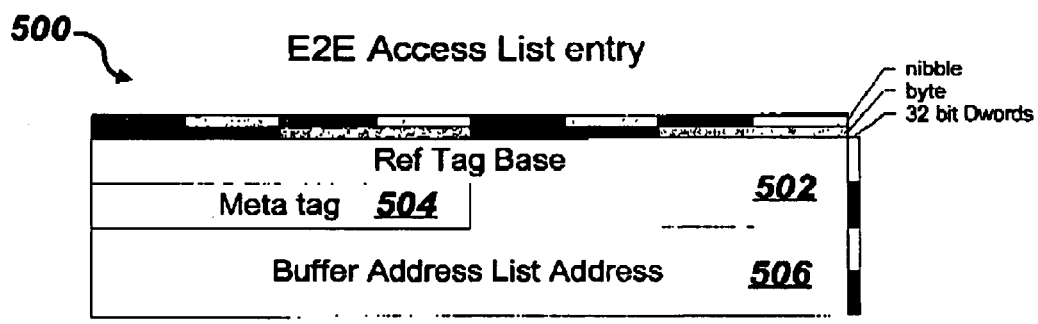
FIG. 5 illustrates a block diagram of an E2E access list entry, in accordance with an embodiment of the present invention.

FIG. 5 illustrates a block diagram of an E2E access list entry 500, in accordance with an embodiment of the present invention. E2E access list entry 500 generally includes a reference tag base 502, a meta tag 504, and a buffer address list address 506. Associated nibble, byte and 32 bit Dword components are also indicated in FIG. 5.

Figure 6:
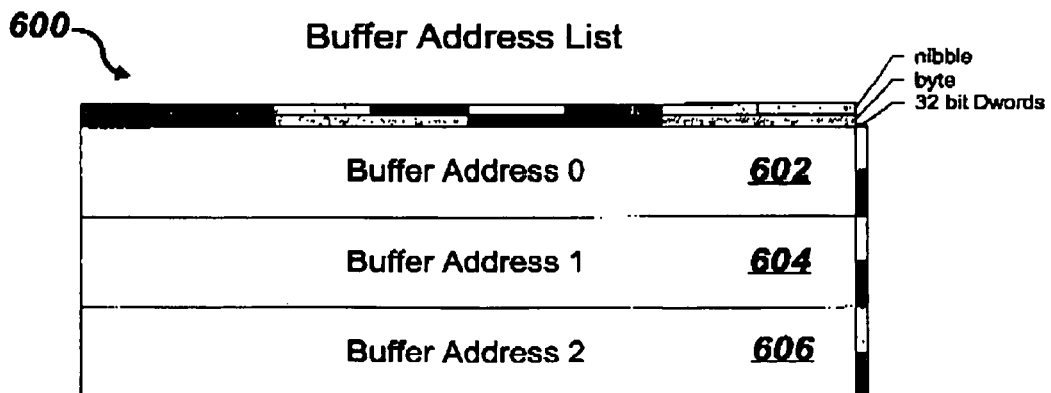
FIG. 6 illustrates a block diagram of a buffer address list, in accordance with an embodiment of the present invention.

FIG. 6 illustrates a block diagram of a buffer address list 600, in accordance with an embodiment of the present invention. Buffer address list 600 includes buffer addresses 602, 604, and 606, which are respectively associated with buffer addresses 0, 1 and 2. It would be advantageous to locate in or associate the buffer address list 600 with a memory controller local memory, so that the memory controller does not have access to the CPU's memory for every PCI data transfer. (Note that an example of a CPU (Central Processing Unit) is processor 102 of FIG. 1).

It is also advantageous for the actual scatter gather list to remain in CPU memory so that the code can modify it as it wishes without PCI access. The consequence of such a configuration, however, is that the firmware must create a buffer address list that is separate from the scatter gather list and then burst it across PCI to memory controller local memory when filling out the E2E access list entry, an example of which is E2E access list entry 500 of FIG. 5.

Figure 7:
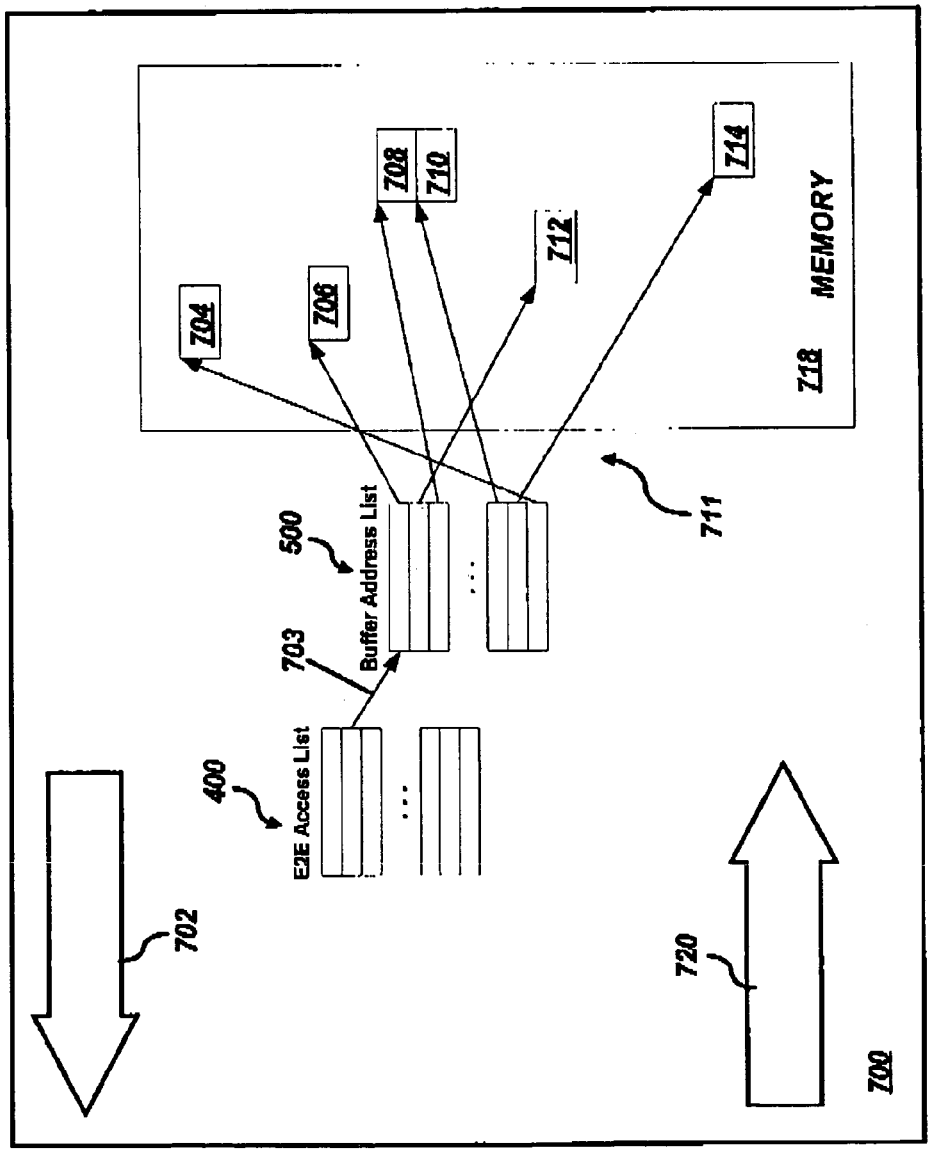
FIG. 7 illustrates a block diagram of a memory controller system, which may be implemented in accordance with an alternative embodiment of the present invention.

FIG. 7 illustrates a block diagram of a memory controller system 700, which may be implemented in accordance with an alternative embodiment of the present invention. It is important to note that the firmware must ensure that entries are not reused before being available. For each access to memory controller local memory with the E2E bit "on" in the address, the memory controller generally compares the meta tag in the DIF to the one in the E2E access list entry and compares the REF tag (reference tag) value incremented for the number of blocks in the offset. The actual data resides in the buffer address list entry associated with the offset utilized. The, in system 700, arrow 702 represents a PCI read request with a virtual address.

The E2E access list 400 and buffer address list 500 of FIGS. 4 and 5 are also shown in FIG. 7. Arrow 703, which is located between E2E access list 400 and buffer address list 500, indicates that an E2E access list entry points to the buffer address list. Arrows 711 indicates a pointing to actual data, which is represented by blocks 704–714 located with a memory 718. Note that memory 718 is generally analogous to main memory 104 of FIG. 1. Block 704 can, for example, represent a block which contains 512 bytes of data plus 8 bytes of DIF. Similar values may hold true for blocks 706–714, depending upon particular embodiments and varying implementations thereof. The memory controller (e.g., controller 103 of system 100) thus can perform a DIF check with meta data in memory against those values in the E2E access list 400. Arrow 720 indicates that the memory controller returns one or more data blocks to a requestor.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A method for end-to-end data protection in a computer, comprising:

associating a data integrity field with data transferred along a data path in a computer; and associating a virtual end-to-end address with said data integrity field, wherein said virtual end-to-end address transfers encoded information to a controller through at least one address of a read and write request thereof, wherein said encoded information identifies an offending entity within said data path; and configuring said virtual end-to-end address to further comprise at least one index and at least offset, wherein said at least one index and said at least one offset can each be varied in size to match a requirement of said controller of said computer.

2. The method of claim 1 wherein said controller comprises a memory controller of said computer.

3. The method of claim 1 further comprising configuring said virtual end-to-end address to further comprise at least one end-to-end bit, which is recognizable by said controller.

4. The method of claim 1 further comprising associating an end-to-end access list with said virtual end-to-end address, wherein said end-to-end access list contains at least one entry for every data transfer request provided to an interface device.

5. The method of claim 4 wherein said interface device comprises a host interface chip.

6. The method of claim 4 wherein said Interface devices comprises a drive interface chip.

7. The method of claim 1 further comprising locating a buffer address within a local memory associated with said controller.

8. The method of claim 1, further comprising configuring said data integrity field to include at least one reference tag, at least one meta tag and at least one guard field, wherein said at least one meta tag comprises a static value and said at least one reference tag comprises an incrementing value.

9. A system for end-to-end data protection in a computer, said system comprising:

a data integrity field associated with data transferred along a data path in a computer; and a virtual end-to-end address, which is associated with said data integrity field, wherein said virtual end-to-end address transfers encoded information to a controller through at least one address of a read and write request thereof, wherein said encoded information identifies an offending entity within said data path, and wherein said virtual end-to-end address comprises at least one end-to-end bit, which is recognizable by said controller.

10. The system of claim 9 wherein said controller comprises a memory controller of said computer.

11. The system of claim 9 wherein said virtual end-to-end address comprises at least one index and at least offset, wherein said at least one index and said at least one offset can each be varied in size to match a requirement of said controller of said computer.

12. The system of claim 9 further comprising an end-to-end access list associated with said virtual end-to-end address, wherein said end-to-end access list contains at least one entry for every data transfer request provided to an interface device.

13. The system of claim 12 wherein said interface device comprises a host interface chip.

14. The system of claim 12 wherein said interface devices comprises a drive interface chip.

15. The system of claim 9 further comprising a buffer address and a local memory associated with said controller, wherein said buffer address is located within said local memory associated with said controller.

16. The system of claim 9 wherein said data integrity field includes at least one reference tag, at least one meta tag and at least one guard field, wherein said at least one meta tag comprises a static value and said at least one reference tag comprises an incrementing value.

17. A system for end-to-end data protection in a computer, said system comprising:

a memory controller within a computer;

a data integrity field associated with data transferred along a data path in said computer, wherein said data integrity field includes at least one reference tag, at least one meta tag and at least one guard field, wherein said at least one meta tag comprises a static value and said at least one reference tag comprises an incrementing value;

a virtual end-to-end address, which is associated with said data integrity field, such that said virtual end-to-end address comprises at least one index, at least offset and at least one end-to-end bit, which is recognizable to said memory controller, and wherein said virtual end-to-end address transfers encoded information to said memory controller through at least one address of a read and write request thereof, such that said encoded information identifies an offending entity within said data path;

an end-to-end access list associated with said virtual end-to-end address, wherein said end-to-end access list contains at least one entry for every data transfer request provided to an interface device; and a buffer address and a local memory associated with said memory controller, wherein said buffer address is located within said local memory associated with said memory controller.

* * * * *